US010994863B2

(12) United States Patent
Germanetti

(10) Patent No.: US 10,994,863 B2
(45) Date of Patent: May 4, 2021

(54) METHOD AND A DEVICE FOR PREDICTIVE DETERMINATION OF PARAMETERS CHARACTERISTIC OF THE OPERATION OF A ROTARY-WING AIRCRAFT IN ORDER TO PERFORM A PREDETERMINED MANEUVER

(71) Applicant: AIRBUS HELICOPTERS, Marignane (FR)

(72) Inventor: Serge Germanetti, Saint Maximin la Sainte Baume (FR)

(73) Assignee: AIRBUS HELICOPTERS, Marignane (FR)

( * ) Notice: Subject to any disclaimer, the term of this patent is extended or adjusted under 35 U.S.C. 154(b) by 132 days.

(21) Appl. No.: 16/514,036

(22) Filed: Jul. 17, 2019

(65) Prior Publication Data

US 2020/0023993 A1    Jan. 23, 2020

(30) Foreign Application Priority Data

Jul. 17, 2018  (FR) ...................................... 1800756

(51) Int. Cl.
  *B64D 45/00*      (2006.01)
  *B64C 27/04*      (2006.01)
          (Continued)

(52) U.S. Cl.
  CPC .............. *B64D 45/00* (2013.01); *B64C 27/04* (2013.01); *B64F 5/60* (2017.01);
          (Continued)

(58) Field of Classification Search
  CPC ........... B64D 45/00; B64D 2045/0085; B64D 43/00; B64F 5/60; B64C 27/04;
          (Continued)

(56) References Cited

U.S. PATENT DOCUMENTS 3,616,691 A    11/1971  Brandau
5,915,273 A     6/1999  Germanetti
              (Continued)

FOREIGN PATENT DOCUMENTS

DE    2014913 A1    10/1970
EP    3064437 A1     9/2016
              (Continued)

OTHER PUBLICATIONS

French Search Report for French Application No. FR 1800756, Completed by the French Patent Office, dated Jun. 7, 2019, 9 pages.

*Primary Examiner* — Mussa A Shaawat
(74) *Attorney, Agent, or Firm* — Brooks Kushman P.C.

(57) ABSTRACT

A method of predictive determination of a power needed by a rotary-wing aircraft to perform hovering flight in order to land. After measuring the current atmospheric pressure and the current temperature outside the aircraft, the method serves to estimate a predicted atmospheric pressure and a predicted temperature at the altitude where the hovering flight is to be performed. Thereafter, both a maximum power available from a power plant of the aircraft once the aircraft has reached the point where the hovering flight is to be performed, and also a power needed from the power plant in order to perform the hovering flight are calculated. Finally, the present invention serves to display the available maximum power and the power needed on an instrument of the aircraft and thereby warn the pilot of the aircraft when the power needed is close to or even greater than the maximum power available.

21 Claims, 2 Drawing Sheets

(51) Int. Cl.
  *B64F 5/60* (2017.01)
  *G01C 5/06* (2006.01)
  *G01C 21/12* (2006.01)
  *G01K 1/14* (2021.01)

(52) U.S. Cl.
  CPC ........ *B64D 2045/0085* (2013.01); *G01C 5/06* (2013.01); *G01C 21/12* (2013.01); *G01K 1/14* (2013.01)

(58) Field of Classification Search
  CPC .......... B64C 27/00; G01C 5/06; G01C 21/12; G01K 1/14
  See application file for complete search history.

(56) References Cited

U.S. PATENT DOCUMENTS

| | | | |
|---|---|---|---|
| 6,195,598 B1 | 2/2001 | Bosqui et al. | |
| 7,275,711 B1* | 10/2007 | Flanigan | B64C 27/18 244/17.11 |
| 2002/0030137 A1* | 3/2002 | Kirjavainen | B64C 29/00 244/51 |
| 2003/0135305 A1* | 7/2003 | Zagranski | B64C 27/12 701/3 |
| 2005/0278084 A1 | 12/2005 | Certain | |
| 2009/0186320 A1* | 7/2009 | Rucci | G09B 9/206 434/33 |
| 2010/0161154 A1* | 6/2010 | Moeckly | F01D 21/003 701/3 |
| 2010/0161196 A1* | 6/2010 | Goericke | F02C 9/00 701/99 |
| 2012/0253560 A1* | 10/2012 | Corpron | B64D 35/04 701/3 |
| 2014/0236534 A1* | 8/2014 | Ling | G05B 23/024 702/182 |
| 2016/0260266 A1 | 9/2016 | Germanetti | |
| 2017/0274992 A1* | 9/2017 | Chretien | H02K 11/33 |

FOREIGN PATENT DOCUMENTS

| | | |
|---|---|---|
| FR | 2749545 A1 | 12/1997 |
| FR | 2756256 A1 | 5/1998 |
| FR | 3033316 A1 | 9/2016 |
| WO | 2005120954 A2 | 12/2005 |
| WO | 2005120954 A3 | 2/2006 |
| WO | 2012087303 A1 | 6/2012 |

* cited by examiner

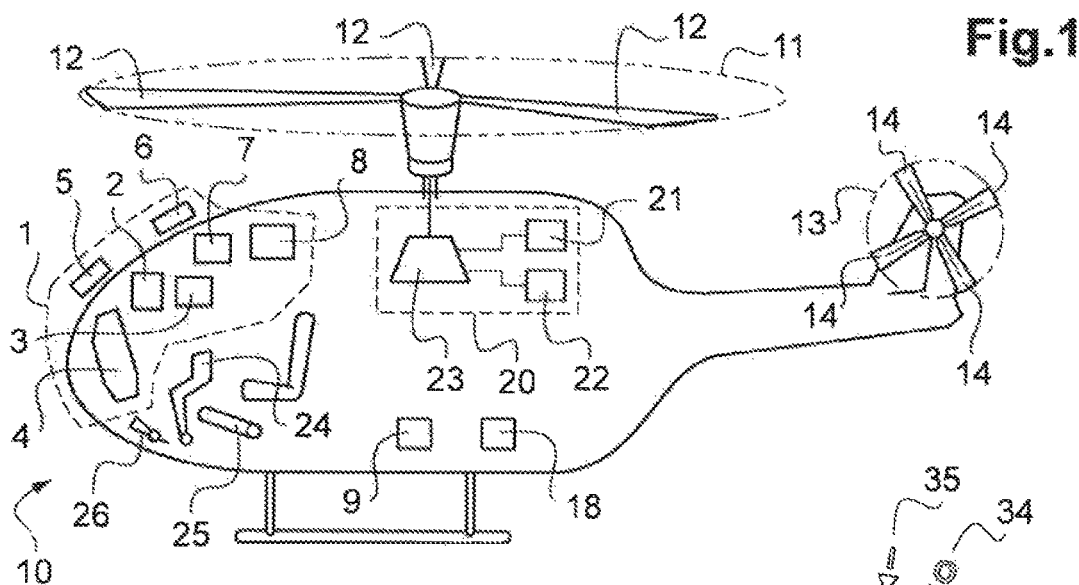
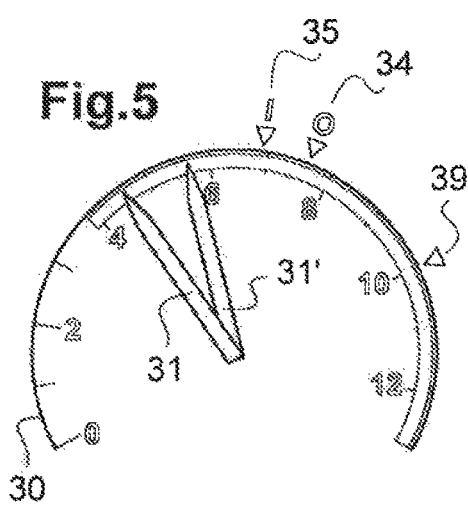
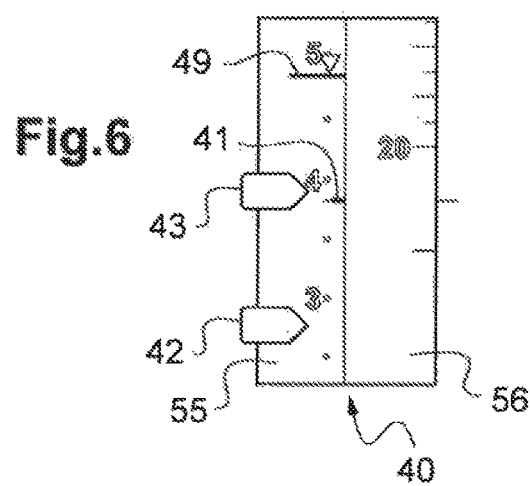
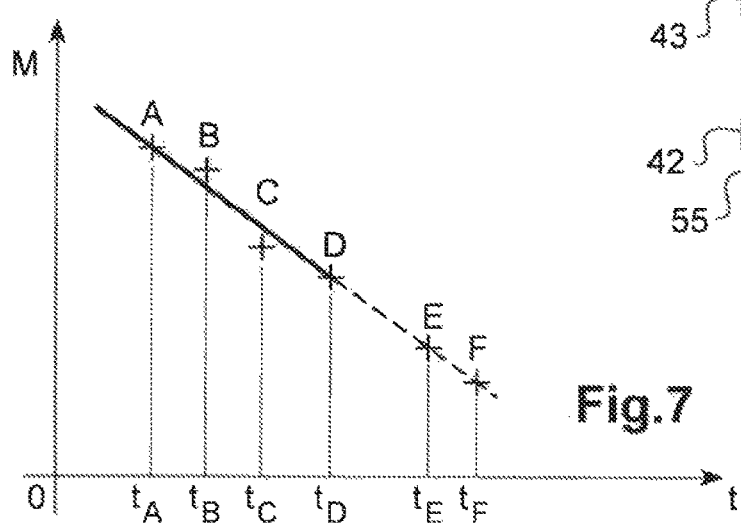

METHOD AND A DEVICE FOR PREDICTIVE DETERMINATION OF PARAMETERS CHARACTERISTIC OF THE OPERATION OF A ROTARY-WING AIRCRAFT IN ORDER TO PERFORM A PREDETERMINED MANEUVER

CROSS-REFERENCE TO RELATED APPLICATIONS

This application claims priority to French patent application No. FR 1800756 filed on Jul. 17, 2018, the disclosure of which is incorporated in its entirety by reference herein.

BACKGROUND OF THE INVENTION

(1) Field of the Invention

The present invention lies in the field of assisting the piloting of aircraft, and in particular of rotary-wing aircraft.

The present invention relates to a method and to a device for predictive determination both of at least one characteristic power needed by a rotary-wing aircraft in order to perform a predetermined maneuver, such as hovering and/or landing the aircraft, and also of a maximum available power. The present invention also relates to a method and to a device for predictive determination both of at least one characteristic power needed for performing a predetermined maneuver and also of parameters characteristic of the operation of the aircraft associated with each power in order to anticipate exceeding a limit for at least one of these characteristic parameters as might occur at the moment when the predetermined maneuver is being performed.

(2) Description of Related Art

The operation of an aircraft generally takes place while various instruments situated on the instrument panel of the aircraft are monitoring a plurality of characteristic parameters. These characteristic parameters are representative of the current operation of the aircraft and in particular of its engine or indeed of its power plant.

For physical reasons, there are numerous limits on these characteristic parameters that need to be taken into account at all times while the aircraft is in operation. These various limits may depend on external conditions and also on the mode of operation of the aircraft. For example, for a rotary-wing aircraft having a power plant with two turboshaft engines and a main power transmission gearbox (MGB), the power plant driving rotation of at least one main rotor and also possibly of an antitorque rotor, such as a tail rotor, these characteristic parameters may include, amongst others: the speed of rotation Ng of the gas generator in each turboshaft engine, the temperature T4 at which gas is injected into the inlet of the free turbine of each engine, and the drive torque $C_m$ of each engine.

Thus, during a flight, the pilot of an aircraft needs to monitor continuously the current values of these characteristic parameters on a plurality of instruments situated on the instrument panel of the aircraft and compare the current values of these characteristic parameters with their respective limits.

Furthermore, these limits generally vary depending on the stage of flight of the aircraft and/or on external conditions, such as temperature and altitude, for example. Specifically, depending on each stage of flight and/or external conditions, and also depending on the mode of operation of the power plant, the maximum power that can be delivered by the power plant is different. Consequently, the limits on the various characteristic parameters of the operation of the aircraft need to differ, in particular depending on the power available from each engine.

Nowadays, certain aides provided to the pilot make it possible to limit the parameters that the pilot needs to monitor.

In particular, Documents FR 2 749 545 and FR 2 756 256 describe an instrument known as a "first limit indicator", often referred to by the acronym FLI. Among the various characteristic parameters, that first limit indicator instrument identifies a characteristic parameter that is critical since it is the parameter that is closest to its limit value. The current value of that critical characteristic parameter and its limit value are then combined on a single display, possibly respectively for each engine, serving to limit the number of instruments that are needed for monitoring the operation of the aircraft, so as to simplify the task of the pilot. FLIs thus serve to display a power margin available to the aircraft or to each engine, by displaying the current value of the critical characteristic parameter together with its limit value.

For example, the current value of the critical characteristic parameter and its limit value may be displayed on a scale graduated in drive torque for each engine, thereby characterizing the power margin available from each engine of the aircraft, as described in Document FR 2 749 545.

The current value of the critical characteristic parameter and its limit value may also be displayed on a scale graduated in collective pitch, where collective pitch gives the angle of incidence of the blades of the main rotor of the aircraft relative to the incident air flow as determined by controlling the collective pitch of those blades, thereby characterizing the power margin available for the aircraft as a whole, as described in Document FR 2 756 256.

Nevertheless, the limits used by instrument panel instruments, and by the FLI in particular, do not represent the real limits of each engine, but predetermined limits, e.g. corresponding to a guaranteed minimum power that an engine is guaranteed to be capable of delivering throughout its lifetime.

Specifically, by calculation or by testing, an engine manufacturer draws up curves representing the power available from an engine as a function in particular of the altitude of the aircraft and of the outside temperature, and does so for each of the power ratings at which each engine can be used. Furthermore, the manufacturer draws up the available power curves depending on various levels of aging for each engine between a new engine and an engine that is coming to the end of its lifetime.

Thereafter, a guaranteed minimum power is defined that an engine is capable of delivering throughout its entire lifetime. The value of this guaranteed minimum power varies in particular as a function of the altitude of the aircraft and of the outside temperature, and it corresponds to the power supplied by an old engine, i.e. an engine that has reached its maximum lifetime. Thus, any engine that is operating normally, i.e. that has not suffered any failure, can always deliver power greater than the minimum specified by this guaranteed minimum power for its entire lifetime.

As a result, instrument panel instruments, and in particular the FLI, that make use of limits corresponding to that guaranteed minimum power are favorable in terms of safety in that the pilot always has power that is genuinely available from each engine that is genuinely greater than the guaranteed minimum, which is equal to the maximum power specified by the instrument panel instruments or by the FLI.

However, it is possible to determine the real power margin that is available from each engine of the power plant of the aircraft relative to that guaranteed minimum power by performing an engine "health" inspection, also referred to as an engine power check (EPC). Such an engine health inspection is generally recommended by the engine manufacturer and needs to be performed regularly. An engine health inspection serves to verify the operating state of an engine and to determining the level of deterioration and/or aging of the engine. An engine health inspection thus serves periodically to verify the real maximum performance of an engine compared with the guaranteed minimum performance.

An engine health inspection is thus performed by comparing the current performance of the engine with performance of that engine as obtained on a test bench and as declared by the manufacturer. An engine health inspection serves to determine a margin for one or more monitoring parameters of the engine relative to a limit value for each monitoring parameter, and consequently to determine the available power margin as constituted by the difference between the maximum power that the engine is capable of delivering and the guaranteed minimum power for the current conditions of the surroundings. By way of example, the conditions taken into consideration may be information about the surroundings of the aircraft and more particularly about atmospheric conditions. In addition, by means of these monitoring parameters, it is possible to deduce whether the engine has suffered deterioration, and whether it needs to be subjected to maintenance operations, in particular in order to be able once more to deliver the mechanical powers for which it is adapted.

By way of example, if the engine is a turboshaft engine, one of the monitoring parameters may be the internal temperature T4 of gas at the inlet to the free turbine, the speed of rotation Ng of the gas generator, or indeed the drive torque $C_m$ delivered by the engine. In addition, an engine health inspection needs to be performed by applying a procedure determined by the manufacturer. This engine health inspection may be performed during a flight or else between two flights.

Furthermore, the instrument panel instruments of an aircraft, including the FLI, give the current values and the limits for one or more characteristic parameters. As a result, when a pilot intends to perform a maneuver, the pilot needs to rely on experience and on the difference that the pilot has observed between those current values and their limits in order to estimate whether the characteristic parameters have sufficient margin to be able to perform the maneuver.

Thereafter, it is only during the maneuver that the pilot will obtain confirmation that none of the characteristic parameters has exceeded its limits and that it is thus possible to perform the maneuver in complete safety.

Otherwise, and depending on the maneuver being performed, the pilot may need to abort the maneuver in order to return to a safe stage of flight, so that each characteristic parameter then remains below its limit. This applies typically when the pilot of an aircraft starts descending and can make use of the inertia of the aircraft and/or the total power available from the power plant in order to perform a maneuver for avoiding an obstacle. Nevertheless, with certain maneuvers, aborting is not possible once the maneuver has been started, in which case an accident may occur, e.g. while landing or during the transition between outside the ground effect and under the influence of the ground effect.

Such an erroneous estimate by the pilot about the available margin, in particular in terms of power, is at the origin of numerous rotary-wing aircraft accidents, in particular during stages of landing, during hovering flight, particularly when near the ground, or when taking off in a pure vertical mode.

Documents FR 3 033 316 and WO 2012/087303 mitigate those drawbacks in part, and they describe a method and a system for monitoring parameters of an aircraft by making use of the power margin available from its engines over and about the guaranteed minimum power, this available power margin being determined while performing an engine health inspection.

Document FR 3 033 316 describes a method of determining characteristic parameters of an aircraft serving in particular to enable the pilot to visualize simultaneously the current values and the real limits of at least one parameter characteristic of the operation of the aircraft, together with the value of each characteristic parameter needed for performing a predetermined maneuver. One parameter characteristic of the operation of the aircraft is in particular the power of its power plant.

Document WO 2012/087303 describes a power monitoring system for a rotary-wing aircraft that provides, at the current instant and as a function of current flight conditions, both the power that is available from its power plant and also the power that is needed to perform hovering flight together with the power that is currently in use.

According to those documents, the power needed for performing the predetermined maneuver, such as performing hovering flight, is estimated as a function of the current flight conditions of the aircraft. However, the maneuver is not going to be performed in the current flight conditions of the aircraft, but rather in the conditions that the aircraft is going to encounter while actually performing that maneuver. Specifically, these flight conditions may vary as the aircraft advances and in particular as a result of change of altitude, e.g. when the aircraft is in an approach stage for landing or for performing a rescue mission that requires hovering flight.

The pilot of the aircraft can thus be informed that the aircraft has sufficient power available for performing a predetermined maneuver under the current flight conditions of the aircraft even though, once in the zone for performing this predetermined maneuver, the flight conditions of the aircraft will generally be different and the power that will actually be available may then not be sufficient for performing the predetermined maneuver, with the aircraft then running the risk of a crash.

The technological background of the invention includes the following documents: US 2005/0278084, DE 2 014 913, and WO 2005/120954.

The prior art therefore does not serve to anticipate and predict accurately the flight conditions that the aircraft is going to encounter when performing a predetermined maneuver, and consequently the power that is needed for performing that predetermined maneuver. By way of example, the predetermined maneuver may be engaging hovering flight at the end of an approach stage, in particular for the purpose of landing.

BRIEF SUMMARY OF THE INVENTION

An object of the present invention is thus to propose a method and a device that enables the above-mentioned limitations to be obviated, by making it possible to determine in predictive manner at least one characteristic power needed by a rotary-wing aircraft to perform a predetermined maneuver and also the maximum power that will be available to that aircraft in the flight conditions that are present at the position where the predetermined maneuver is going to be performed, in order to anticipate at least one of the characteristic parameters of the aircraft applicable to performing the predetermined maneuver potentially exceeding a limit.

The present invention provides a method of predictive determination of at least one characteristic power needed by a rotary-wing aircraft for performing a predetermined maneuver, the aircraft having a plurality of sensors, at least one calculator or else a processor, at least one memory, and at least one display device.

The rotary-wing aircraft also has a main rotor with main blades, an antitorque rotor with secondary blades, control devices for controlling movements of the aircraft, and a power plant provided with at least one engine, e.g. a turboshaft engine, and a mechanical power transmission device. The mechanical power transmission device comprises an MGB driving rotation of the main rotor and of the antitorque rotor. The control device is a device for controlling variation in the collective pitch and in the cyclic pitch of the main blades of the main rotor and also for controlling the collective pitch of the secondary blades of the antitorque rotor.

The method of the invention comprises the following main steps:
  a first measurement of a current atmospheric pressure Pc and of a current temperature Tc outside the aircraft at a current altitude Zc of the aircraft;
  a first determination of at least one parameter relating either to the current altitude Zc of the aircraft, or to a predicted altitude Zp at which the predetermined maneuver of the aircraft is to be performed, or to the current altitude Zc of the aircraft and to the predicted altitude Zp at which the predetermined maneuver is to be performed;
  a second determination of a predicted atmospheric pressure Pp at the predicted altitude Zp;
  a third determination of a predicted temperature Tp at the predicted altitude Zp;
  a fourth determination of a maximum power available from the power plant at the predicted altitude Zp while taking account of the predicted atmospheric pressure Pp and of the predicted temperature Tp; and
  a fifth determination of at least one characteristic power of the power plant needed by the aircraft to perform the predetermined maneuver.

As a result, the method of the invention serves advantageously to determine the flight conditions of the aircraft at the predicted altitude Zp corresponding to the point at which the aircraft is to perform the predetermined maneuver, where these flight conditions are generally different from the current flight conditions of the aircraft. Thereafter, as a function of these flight conditions at the predicted altitude Zp, the method of the invention serves to estimate the maximum power available from the power plant of the aircraft at the predicted altitude Zp.

Knowing this maximum power available from the power plant of the aircraft at the predicted altitude Zp then enables the pilot advantageously to anticipate performing the predetermined maneuver at the predicted altitude Zp, the characteristic power of the power plant needed for enabling the aircraft to perform this predetermined maneuver also being estimated. The predetermined maneuver can thus be prepared, and it can be performed safely when the maximum power available at the predicted altitude Zp is sufficient to enable the predetermined maneuver to be performed. As a result, the pilot can advantageously anticipate any maximum power limit of the aircraft power plant being exceeded, as might occur when performing the predetermined maneuver.

The method of the invention may then include an additional step of displaying, simultaneously on a single graphical type representation on a display device of the aircraft, both the maximum power available from the power plant at the predicted altitude Zp, and also at least one characteristic power of the power plant needed for enabling the aircraft to perform a predetermined maneuver.

This graphical type representation may be of various forms. For example, the graphical type representation may be a dial of substantially circular shape, or else a vertical scale.

During the additional display step, the method of the invention may also display, on the graphical type representation, a guaranteed minimum power $P_G$ of the power plant. This guaranteed minimum power $P_G$ is determined as a function of the predicted temperature Tp and of the predicted atmospheric pressure Pp at the predicted altitude Zp.

As a result, the pilot of the aircraft can see simultaneously, for the same conditions at the predicted altitude Zp: a maximum power available from the power plant, a characteristic power needed for performing a predetermined maneuver, and the minimum guaranteed power $P_G$. In particular when the pilot performs the same flight regularly, displaying these values serves advantageously to enable the pilot to be aware firstly that the available power margin decreases over time as a result of the power plant aging.

In addition, displaying these values also serves to enable the pilot to observe that although certain power-hungry maneuvers can be performed at present, that is only because there is an available power margin since the characteristic power needed for performing the power-hungry maneuvers is greater than the guaranteed minimum power $P_G$, such that with the aging of the power plant and with the associated reduction in its power margin, the aircraft might no longer be capable of performing these maneuvers.

Furthermore, the method of the invention may determine an instantaneous power delivered by the power plant of the aircraft and display it simultaneously with the maximum available power and with each characteristic power.

The power plant may have a single engine. Under such circumstances, the maximum available power, the characteristic power from the power plant, and the instantaneous power delivered by the power plant are respectively substantially equal to a maximum available power, to a characteristic power from the engine, and to the instantaneous power delivered by the engine.

The power plant may also comprise at least two engines. Under such circumstances, the maximum available power, the characteristic power from the power plant, and the instantaneous power delivered by the power plant are shared between those engines. When the engines are identical, those powers are preferably shared substantially uniformly among the engines. Nevertheless, a special distribution may be defined among the various engines of the power plant, whether those engines are identical or indeed different. The maximum available power and the characteristic power respectively from each engine and the respective instantaneous power from each engine may be displayed on the display instead of powers for the power plant as a whole. The crew of the aircraft then has a graphical type representation for each engine of the power plant.

The display device of the aircraft may display the characteristic power and, where appropriate, the instantaneous power delivered by the power plant together with the guaranteed minimum power $P_G$ as a percentage of the maximum power, the maximum power then corresponding to an indication of 100% on the display device of the aircraft. This type of display makes it possible to ignore actual numerical values.

Nevertheless, the maximum power and the characteristic power, possibly together with the instantaneous power delivered by the power plant and the guaranteed minimum power $P_G$ may be alternatively displayed as percentage of a reference power value for the power plant, which reference value then corresponds to an indication of 100% on the display device of the aircraft.

By way of example, the predetermined maneuver of a rotary-wing aircraft may be hovering flight, which consumes a large amount of mechanical power delivered by the power plant, and which is performed in particular for the purpose of landing the aircraft, with the method of the invention then being initiated at the beginning of the approach stage to this hovering flight and being executed throughout the entire duration of the approach stage. This predetermined maneuver may be hovering flight outside the ground effect or it may be hovering flight under the influence of the ground effect. By way of example, the method of the invention may serve to display simultaneously the characteristic powers of the power plant needed for performing hovering flight outside the ground effect and for performing hovering flight under the influence of the ground effect. Such hovering flight is performed in particular in a procedure for landing the aircraft.

As a result, the method of the invention serves to assist the pilot of the aircraft in anticipating and possibly performing a landing procedure, thereby significantly reducing the risks associated with such a landing stage. Specifically, before engaging hovering flight, the pilot can see whether a sufficient power margin is available, with this applying in particular during transitions between a zone where the aircraft is not subjected to the ground effect and a zone where the aircraft is subjected to the ground effect.

The first measurement of the current atmospheric pressure Pc and of the current temperature Tc outside the aircraft is performed by means of sensors that are conventionally present in an aircraft.

Thereafter, in a first implementation of the invention, during the first determination, a single parameter relating to the current altitude Zc and to the predicted altitude Zp can be determined. This parameter relating to the current altitude Zc and to the predicted altitude Zp is then equal to an altitude variation $\Delta Z$ between the current altitude Zc and the predicted altitude Zp.

Under such circumstances and by way of example, the first determination comprises a second measurement of a current height Hc of the aircraft relative to the ground, taken by means of a radioaltimeter, also referred to as a "radiosensor". The altitude variation $\Delta Z$ is then equal to the current height Hc of the aircraft relative to the ground.

In another example, the said first determination may comprise the following additional substeps:
  a sixth determination of a descent speed Vz of the aircraft;
  a definition of a transit time Ts to enable the aircraft to reach the predicted altitude Zp; and
  a first calculation of the altitude variation $\Delta Z$ during the transit time Ts, the altitude variation $\Delta Z$ being equal to the product multiplication of the descent speed Vz and by the transit time Ts.

By way of example, the transit time Ts for reaching the predicted altitude Zp may be a value that is predetermined before takeoff of the aircraft, or else that is predetermined in flight by the crew of the aircraft.

During the sixth determination of the descent speed Vz of the aircraft, said descent speed Vz of the aircraft is defined as being equal to the mean value of the vertical speed of the aircraft over a predefined duration, e.g. equal to the ten most recent seconds (10 s) of flight of the aircraft prior to performing this sixth determination.

In a second implementation of the invention, during the first determination, it is also possible to determine two parameters, a first parameter relating to the current altitude Zc and a second parameter relating both to the current altitude Zc and to the predicted altitude Zp. A first parameter is equal to the current altitude Zc and a second parameter is equal to an altitude variation $\Delta Z$ between the current altitude Zc and the predicted altitude Zp.

The altitude variation $\Delta Z$ may be determined using either of the two examples mentioned above for the first implementation, while the current altitude Zc of the aircraft is determined by a device that is conventionally present on an aircraft, such as a barometric sensor or indeed a receiver of a global navigation satellite system (GNSS).

The predicted altitude Zp may then be calculated from those two parameters, and it is equal to the difference between the current altitude Zc and the altitude variation $\Delta Z$.

In a third implementation of the invention, during the first determination, two parameters are determined comprising a first parameter relating to the current altitude Zc and a second parameter relating to the predicted altitude Zp. A first parameter is equal to the current altitude Zc and a second parameter is equal to the predicted altitude Zp.

The current altitude Zc of the aircraft is determined by a device that is conventionally present in an aircraft. The predicted altitude Zp for the point where the aircraft is to perform the predetermined maneuver may be determined in various ways.

For example, the predicted altitude Zp may be defined by the crew of the aircraft, with the value of this predicted altitude Zp being supplied directly by means of an input device available in the aircraft.

The predicted altitude Zp may also be extracted from a terrain database such as the terrain awareness warning system (TAWS) database. This TAWS database associates an altitude with each point of terrain overflown by the aircraft, and the point where the predetermined maneuver is to be performed can then be identified or designated in the TAWS database.

In a first implementation of such a terrain database, the first determination comprises the following substeps:
  a seventh determination of a current position of the aircraft, typically by using a GNSS receiver; and
  a first estimation of the predicted altitude Zp equal to an altitude of the terrain as stored in the terrain database for a position vertically below the current position of the aircraft.

In a second implementation of such a terrain database, the first determination comprises the following substeps:
  a seventh determination of the current position of the aircraft;
  a second estimation of a current path of the aircraft, this current path being defined by way of example by the direction of the forward speed vector of the aircraft; and
  a third estimation of the predicted altitude Zp, which is equal to the altitude of a point of contact between the current path of the aircraft and the terrain stored in the terrain database.

The predicted altitude Zp may also be defined by a warning associated with the TAWS terrain database and warning of proximity and the possibility of the aircraft colliding with the terrain. The predicted altitude Zp is defined, as for the second example, as being equal to the altitude of the point of contact between the path of the aircraft and the terrain.

In this third implementation, the altitude variation ΔZ between the current altitude Zc and the predicted altitude Zp may then be calculated from these two parameters and is equal to the difference between the current altitude Zc and the predicted altitude Zp.

Thereafter, as a function of one or two parameters relating either to the current altitude Zc, or to the predicted altitude Zp, or to both the current altitude Zc and the predicted altitude Zp, the second determination serves to determine the predicted atmospheric pressure Pp at the predicted altitude Zp.

When the first determination is performed as in the first implementation and determines only the altitude variation as a parameter, the second determination comprises the following substeps:
 a fourth estimation of the current altitude Zc as a function solely of the current atmospheric pressure Pc or else as a function of the current atmospheric pressure Pc and of the current temperature Tc;
 an eighth determination of an atmospheric pressure variation ΔP between the current altitude Zc and the predicted altitude Zp as a function of the altitude variation ΔZ and using curves plotting variation of the atmospheric pressure with altitude, and as a function of the current altitude Zc, and
 a second calculation of the predicted atmospheric pressure Pp, the predicted atmospheric pressure Pp being determined by adding the atmospheric pressure variation ΔP to the current atmospheric pressure Pc.

An altitude is said to be "barometric" when it is determined solely by using the current atmospheric pressure Pc. The altitude is said to be a "density" altitude when it is determined using the current atmospheric pressure Pc and also the current temperature Tc, with the current temperature Tc serving in particular to correct the altitude provided by the current atmospheric pressure Pc.

The atmospheric pressure variation ΔZ is determined using one or more series of curves, also referred to as charts, plotting variation of atmospheric pressure with altitude, and as a function of the current altitude Zc.

When the first determination is performed in accordance with the second or third implementation and determines as parameters the current altitude Zc and also the altitude variation or else the predicted altitude Zp, the second determination of the predicted atmospheric pressure Pp comprises the following substeps:
 a third calculation of two normal pressures, respectively for said current altitude Zc and for said predicted altitude Zp, by applying a barometric leveling formula;
 a ninth determination of atmospheric pressure variation ΔP equal to the difference between the two normal pressures relating to the current altitude Zc and to the predicted altitude Zp; and
 a fourth calculation of said predicted atmospheric pressure Pp, said predicted atmospheric pressure Pp being determined by adding said atmospheric pressure variation ΔP to said current atmospheric pressure Pc.

A barometric leveling formula serves to calculate atmospheric pressure as a function of altitude, making assumptions concerning the vertical temperature gradient as a function of altitude and also concerning an atmospheric pressure value for a reference altitude, generally at sea level and corresponding to an altitude of zero.

Such a barometric leveling formula thus serves to calculate the atmospheric pressure at a certain altitude without it being necessary to know the real temperature or vertical temperature gradient. The accuracy of the values obtained in this way might nevertheless be limited, since the mean state of the atmosphere corresponding to the selected assumptions is generally different from the real state of the atmosphere.

Nevertheless, the method of the invention making use of an atmospheric pressure variation ΔP equal to the difference between two normal pressures in application of such a barometric leveling formula serves advantageously to limit or indeed to eliminate the inaccuracies generated by those assumptions.

Whatever the implementation associated with the first determination, the third determination of the predicted temperature Tp comprises the following substeps:
 a fifth calculation of a temperature variation ΔT between the current altitude Zp and the predicted altitude Zp as a function of the altitude variation ΔZ; and
 a sixth calculation of the predicted temperature Tp at the predicted altitude Zp, the predicted temperature Tp being determined by adding the temperature variation ΔT to the current temperature Tc.

It is known that variation of temperature as a function of altitude is substantially linear, in particular for the altitudes where rotary-wing aircraft fly. For example, temperature drops by 0.65 degrees Celsius (0.65° C.) for an increase in altitude of 100 meters (100 m).

In addition, the total power delivered by the power plant, or the power delivered by an engine of the power plant, is a function of various parameters of the power plant and/or of each engine in the power plant, e.g. as described in Document FR 3 033 316.

For example, the instantaneous power delivered by an engine may be defined as a function of a drive torque $C_m$ delivered by the engine to a transmission shaft and of an instantaneous speed of rotation $N_m$ of the transmission shaft of the engine, by means of the following formula:

$$W_{inst} = C_m \cdot N_m$$

In addition, the power delivered by the power plant of the aircraft is shared firstly between a flight power of the aircraft enabling the aircraft to fly, and secondly by an accessory power for powering equipment on board the aircraft. By way of example, the accessory power is used to power air conditioning for the aircraft cabin, to power the electrical equipment of the aircraft, such as its avionics, to power the hydraulic equipment of the aircraft, or indeed to power a sand filter when the aircraft has one. This accessory power is made up mainly of electrical power and of hydraulic power and it can be determined in known manner.

The flight power of the aircraft is shared between the main rotor and the antitorque rotor in order to provide the aircraft with lift and with propulsion. This flight power of the aircraft is thus the sum of the power delivered to the main rotor plus the power delivered to the antitorque rotor.

When a power plant has only one engine, the power that must be delivered by that engine, and thus by the power plant, in order to perform the predetermined maneuver is equal to the sum of the characteristic power of the engine plus the accessory power of the aircraft.

When a power plant has a plurality of engines that are identical, the power that is to be delivered by the power plant in order to perform the predetermined maneuver is equal to the sum of the characteristic power of each engine, representing the characteristic power of the power plant, plus the accessory power of the aircraft.

The instantaneous power delivered by each engine of the power plant can be determined in known manner, e.g. by means of the instantaneous torque delivered by the engine. Furthermore, when the engine is a turboshaft engine, the instantaneous power may be determined by means of the instantaneous internal temperature T4 of the gas admitted into the free turbine of the turboshaft engine, or indeed by the instantaneous speed of rotation Ng of its gas generator.

The maximum power available from each engine of the power plant is determined by using performance curves of the aircraft while taking account of a power margin available relative to a guaranteed minimum power $P_G$ of each engine, e.g. as described in Document FR 3 033 316. The maximum power that is available is a function of current surrounding conditions and of the stage of flight of the aircraft.

The power margin of each engine of the power plant may be determined in known manner and periodically when performing an engine health inspection. Under such circumstances, the method of the invention may take account of this power margin, with the fourth determination of the maximum power available from the power plant including the following additional steps:

a tenth determination of a power margin from each engine of the power plant relative to a guaranteed minimum power $P_G$, the power margin characterizing a state of aging of each engine of the power plant; and a seventh calculation of the maximum power available from each engine, this available maximum power being equal to the sum of the guaranteed minimum power $P_G$ plus the power margin of the engine.

Nevertheless, a certain amount of flying time might elapse between two engine health inspections, and the known power margin then no longer corresponds to the real state of aging of each engine. In order to take this real state of aging of each engine into account, a new determination of the power margin of each engine may be performed by the method of the invention.

Under such circumstances, the tenth determination of the power margin of each engine includes the following additional steps:

an eleventh determination of a curve plotting variation of the power margin of each engine as a function of at least the two most recently performed engine health inspections;

a twelfth determination of a transit time Ts for the aircraft to reach the predicted altitude Zp; and a thirteenth determination of the power margin of said engine of the power plant on the basis of the curve plotting variation of the power margin for each engine, and while taking account of the time each engine has been in operation since the most recently performed engine health inspection up to the current instant, and while taking account of the transit time Ts.

The curve for variation in the power margin of each engine is thus defined on the basis of the most recently performed engine health inspection. Such a curve for variation in the power margin can be used once two engine health inspections have been performed. Nevertheless, a curve for variation in the power margin preferably requires at least five engine health inspections to be performed in order to be more representative of the aging of each engine.

The transit time Ts as determined during the twelfth determination is preferably equal to a ratio of the altitude variation $\Delta Z$ between the predicted altitude Zp and the current altitude Zc of the aircraft divided by the descent speed Vz. Nevertheless, if this calculation cannot be performed, the transit time Ts may be equal to a value that is predetermined before takeoff of the aircraft or else to a value that is predetermined in flight by the crew of the aircraft.

Furthermore, the characteristic power of the power plant needed for enabling the aircraft to perform a predetermined maneuver may be determined, e.g. as described in Document FR 3 033 316. In addition, it is possible to use an estimated weight M of the aircraft in order to determine the characteristic power of the power plant. Specifically, the power plant of the aircraft needs to deliver sufficient power to ensure that the lift from the main rotor at least cancels the estimated weight M of the aircraft. This estimated weight M of the aircraft may be determined before takeoff of the aircraft. In flight, the instantaneous weight of the aircraft decreases, in particular as a result of consuming fuel, and then becomes less than the estimated weight M. As a result, the estimated weight M of the aircraft may be used in order to determine each characteristic power for enabling the aircraft to perform a predetermined maneuver.

Nevertheless, this characteristic power is then over-evaluated relative to the mechanical power that is actually necessary for enabling the aircraft to perform the predetermined maneuver, since the estimate of the weight M of the aircraft is greater than its instantaneous weight. This over-evaluated characteristic power goes in a fail-safe direction, since the mechanical power that is actually needed is less than the over-evaluated characteristic power. However, for certain maneuvers that require a large amount of mechanical power, this over-evaluated characteristic power may be greater than the maximum power available even though mechanical power that is actually needed to enable the aircraft to perform the predetermined maneuver is less than the maximum power available from each engine. As a result, the maneuver will not be performed by the pilot, believing wrongly that the power plant cannot deliver sufficient total power.

Preferably, an estimated instantaneous weight $M_{inst}$ of the aircraft is then defined and used in order to determine more accurately each characteristic power for enabling the aircraft to perform a predetermined maneuver. This estimated instantaneous weight $M_{inst}$ of the aircraft may for example be determined by calculating fuel consumption during the flight, with the weight of the fuel that has been consumed then being subtracted from the weight M of the aircraft as estimated prior to takeoff.

Furthermore, the method of the invention may also serve to determine and display values for at least one characteristic parameter Pi relating to the state or to the operation of the aircraft or indeed of its power plant, this characteristic parameter Pi being associated with the power of the power plant. The characteristic parameter Pi may also be a characteristic parameter relating to the position or to the movement of the aircraft relative to its surroundings.

As described in Document FR 3 033 316, for at least one characteristic parameter Pi, it is also possible to determine at least one first value Pi_lim corresponding to the maximum power available from the power plant, at least one second value Pi_X corresponding to a characteristic power of the power plant needed for performing a predetermined maneuver, and/or at least one third value Pi_inst corresponding to the instantaneous power delivered by the power plant, and these values can be displayed on a single graphical type display.

As a result, the pilot of the aircraft can see directly firstly a difference between the third value Pi_inst and the first value Pi_lim, and secondly the margin available to the pilot between the third value Pi_inst and the second value Pi_X needed for performing the predetermined maneuver at the predicted altitude Zp.

Furthermore, it is possible to limit the amount of information supplied to the pilot of the aircraft by displaying only information about the parameter Pi that is the most critical. For example, it is possible to display each first value Pi_lim, each second value Pi_X, and each third value Pi_inst where applicable on a first limit instrument of the aircraft.

In addition, the method of the invention is preferably performed while the aircraft is in stable flight. A flight of the aircraft is considered as being "stable" when the characteristic parameters of the aircraft, and in particular a descent speed Vz and a true air speed Vp of the aircraft and also a torque Cm delivered by the power plant are considered as being stable simultaneously.

By way of example, a characteristic parameter of the aircraft is considered as being stable when, on applying the characteristic parameter to a highpass filter, typically of the "washout" type, and having a time constant $\tau$, a difference between two consecutive values of the characteristic parameter that are separated by the time constant $\tau$ is less than a predetermined threshold.

A characteristic parameter of the aircraft may also be considered as being stable when a derivative of such a highpass washout type filter applied to the characteristic parameter is less than another predetermined threshold.

Furthermore, the values obtained by such a highpass washout type filter for each of these characteristic parameters of the aircraft may be used in calculations performed by the method of the invention. By way of example, the following filtered values are obtained for the characteristic parameters of the aircraft:

the torque Cm delivered by the power plant:

$$Cm_{filtered} = Cm_{measured} \times \frac{\tau \cdot s}{1 + \tau \cdot s}$$

where s is the Laplace variable;

the true air speed Vp of the aircraft $$Vp_{filtered} = Vp_{measured} \times \frac{\tau \cdot s}{1 + \tau \cdot s}$$

and the descent speed Vz of the aircraft:

$$Vz_{filtered} = Vz_{measured} \times \frac{\tau \cdot s}{1 + \tau \cdot s}$$

The present invention also provides a device for predictive determination of at least one power needed to enable a rotary-wing aircraft to perform a predetermined maneuver, the device having a plurality of sensors, at least one calculator, at least one memory, and at least one display device. The sensors providing measurements of information relating to the surroundings of the aircraft and/or to the state and the operation of the aircraft and its equipment, and/or to the position and the movements of the aircraft relative to its surroundings, each calculator receiving the measurements from the sensors and processing that information.

The aircraft may also include a radioaltimeter for determining a current height Hc of the aircraft relative to ground. The aircraft may also include a barometric sensor or indeed a GNSS receiver in order to determine a current altitude Zc of the aircraft.

The memory stores curves plotting performance of the aircraft, a curve plotting variation in the power margin of each engine, one or more series of curves plotting variation of atmospheric pressure as a function of altitude, and calculation instructions, the calculator using the calculation instructions in order to perform the method of predictive determination of at least one power needed to enable a rotary-wing aircraft to perform a predetermined maneuver, as described above.

BRIEF DESCRIPTION OF THE DRAWINGS

The invention and its advantages appear in greater detail from the context of the following description of examples given by way of illustration and with reference to the accompanying figures, in which:

FIG. 1 shows a rotary-wing aircraft provided with a device for predictive determination of at least one characteristic power needed for performing a predetermined maneuver of a rotary-wing aircraft;

FIGS. 4 to 6 are graphical type representations showing powers of the power plant of the aircraft; and FIG. 7 is a curve plotting variation in the power margin of an engine of the power plant of the aircraft.

DETAILED DESCRIPTION OF THE INVENTION

Figure 3:
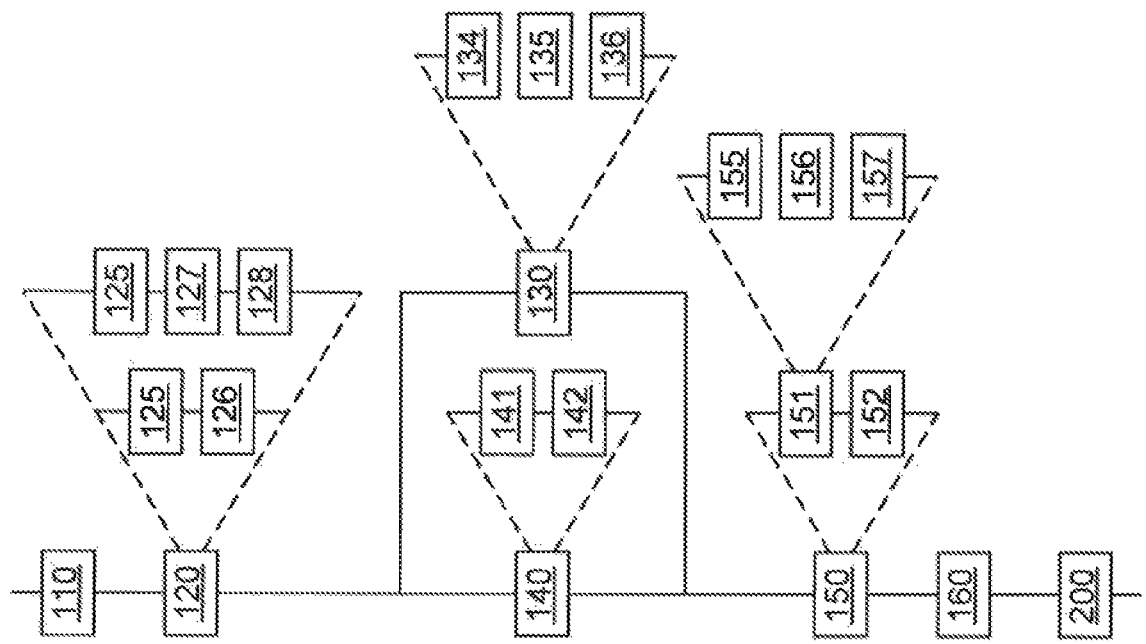
FIGS. 2 and 3 are summary flow charts of a method of predictive determination of at least one characteristic power needed for performing a predetermined maneuver of a rotary-wing aircraft.

Elements present in more than one of the figures are given the same references in each of them.

FIG. 1 shows a rotary-wing aircraft 10 having a main rotor 11 with main blades 12, and a tail rotor 13 serving in particular to provide an antitorque function, the tail rotor 13 being provided with secondary blades 14. The aircraft 10 also has a power plant 20 provided with two turboshaft engines 21 and 22, a main power transmission gearbox (MGB) 23 driving rotation of the main rotor 11 and of the tail rotor 13, and control devices 24, 25, 26 made up of a collective pitch lever 24 and a cyclic stick 25 that are respectively a control device for varying the collective pitch and the cyclic pitch of the main blades 12, and also pedals 26 constituting a control device for varying the collective pitch of the secondary blades 14. These control devices 24, 25, 26 enable the pilot to control movements of the aircraft 10. The two engines 21 and 22 are identical, each comprising a gas generator and a free turbine. These two engines 21 and 22 deliver substantially the same power to the MGB 23 when both engines 21 and 22 are operating correctly.

Nevertheless, the two engines 21 and 22 could be different and could then deliver different powers to the MGB 23. A particular distribution of these powers is then defined between the engines 21 and 22.

Finally, the aircraft 10 has a device 1 for predictive determination of at least one characteristic power needed by the aircraft 10 for performing a predetermined maneuver, which device has a plurality of sensors 5-8, calculator 2, a memory 3, and at least one display device 4, such as a screen. The sensors 5-8 serve to measure information about the surroundings of the aircraft 10, about the state and the operation of the aircraft 10 and of the power plant 20, about the state of the control devices 24, 25, 26, and also about the position and the movements of the aircraft 10.

By way of example, these sensors 5 and 6 comprise a device for measuring current atmospheric pressure Pc and a device for measuring current temperature Tc outside the aircraft 10. By way of example, the sensors 7 and 8 comprise both a device for determining the attitude and the heading of the aircraft 10, such as an attitude and heading reference system (AHRS), and also a system for controlling the power plant 20. The aircraft 10 also has a radioaltimeter 9 that determines the current height Hc of the aircraft 10 relative to the ground, and a measurement device 18 for measuring a current altitude Zc of the aircraft 10, such as a barometric sensor or indeed a GNSS receiver.

Figure 2:
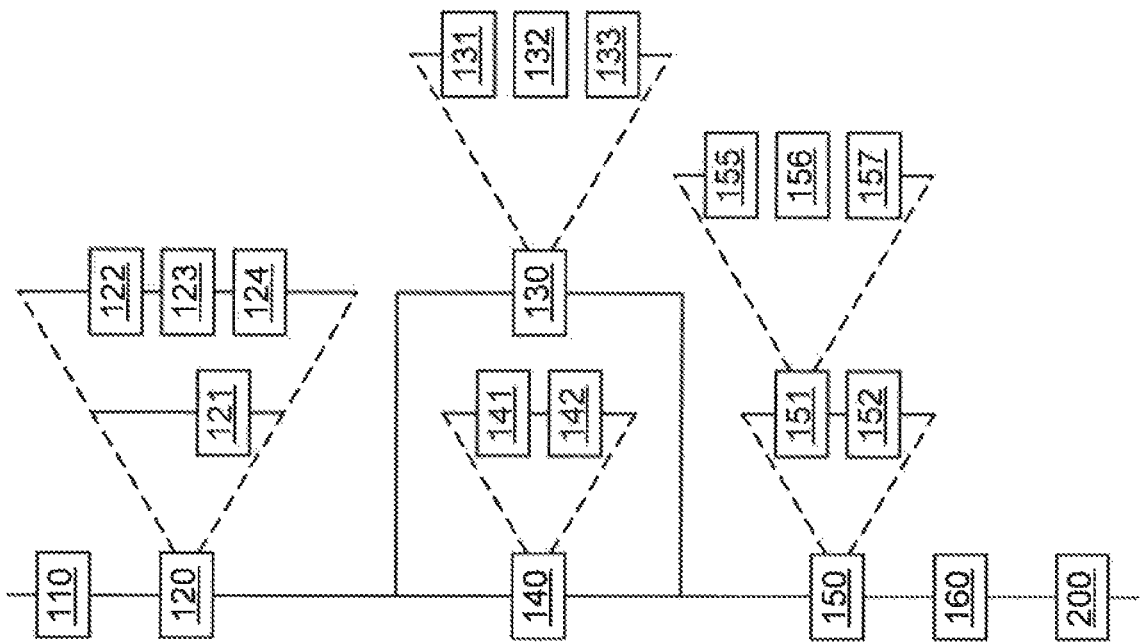

The device 1 serves to perform a method of predictive determination of at least one characteristic power needed by the aircraft 10 for performing a predetermined maneuver, with two implementations being summarized in FIGS. 2 and 3. The memory 3 stores performance curves for the aircraft 10, a curve plotting variation in the power margin for each engine of the power plant 20 of the aircraft 10, and calculation instructions. The calculator 2 uses these calculation instructions in order to perform the method.

These two implementations of the method comprise ten main steps, and they differ in the substeps of the main steps.

During a first measurement 110, information about the surroundings of the aircraft 10 is measured, specifically a current atmospheric pressure Pc and a current temperature Tc outside the aircraft 10. This information is obtained in particular by means of the two sensors 5 and 6.

During a first determination 120, at least one parameter is determined relating either to the current altitude Zc of the aircraft 10, or else a predicted altitude Zp for performing the predetermined maneuver of the aircraft 10, or indeed both to the current altitude Zc of the aircraft 10 and to the predicted altitude Zp for performing the predetermined maneuver.

In a first implementation of the method as shown in FIG. 2, only one parameter relating to the current altitude Zc and to the predicted altitude Zp is determined during this first determination 120. This parameter is an altitude variation $\Delta Z$ between the current altitude Zc and the predicted altitude Zp.

In a first example of this first implementation, the first determination can then comprise a second measurement 121 of a current height Hc of the aircraft relative to the ground, performed by means of the radioaltimeter 9, and equal to the altitude variation $\Delta Z$.

In another example of this first implementation, the first determination 120 may comprise the following substeps:
  a sixth determination 122 of a descent speed Vz of the aircraft 10;
  a definition 123 of a transit time Ts for the aircraft 10 reaching the predicted altitude Zp, which transit time Ts may be defined prior to the aircraft 10 taking off or else in flight by the crew of the aircraft 10; and
  a first calculation 124 of the altitude variation $\Delta Z$ during the transit time Ts performed by the calculator 2, with the aircraft 10 travelling at the descent speed Vz, the altitude variation $\Delta Z$ being equal to the product multiplication of the descent speed Vz and by the transit time Ts. The calculator may comprise any type of processor, such as a central processing unit (CPU) or a graphics processing unit (GPU), including a general purpose processor, a digital signal processor (DSP), a microcontroller, an application specific integrated circuit (ASIC), and a field programmable gate array (FPGA).

In a second implementation of this method, as shown in FIG. 3, two parameters are determined during the first determination 120. A first parameter is the current altitude Zc and a second parameter is the predicted altitude Zp. On the basis of these two parameters, the altitude variation $\Delta Z$ can be calculated, being equal to the difference between the current altitude Zc and the predicted altitude Zp.

The current altitude Zc of the aircraft 10 is known from the measurement device 18.

The predicted altitude Zp for the point where the predetermined maneuver is to be performed by the aircraft 10 can be determined using various methods.

For example, the predicted altitude Zp may be defined by the crew of the aircraft using an input device.

The predicted altitude Zp may also be extracted from a terrain awareness system (TAWS) stored in the memory 3. The aircraft 10 then has a GNSS receiver serving to define the current position of the aircraft 10 from its latitude and longitude coordinates in a terrestrial reference frame. The GNSS receiver may then be used as a measurement device 18 for measuring the current altitude Zc of the aircraft 10.

The first determination 120 may then comprise the following two substeps:
  a seventh determination 125 of the current position of the aircraft 10; and
  a first estimation 126 of the predicted altitude Zp equal to an altitude for the terrain as stored in the terrain database for a position vertically below the current position of the aircraft 10.

Under such circumstances, the path followed by the aircraft 10 is not taken into account.

Nevertheless, the current path of the aircraft 10 can be used for determining the predicted altitude Zp by extracting a point of contact with the terrain for this path in the terrain database TAWS. The path of the aircraft 10 is traditionally defined by the direction of the forward speed vector of the aircraft 10.

Under such circumstances, the first determination 120 comprises the following three substeps:
  the seventh determination 125 of the current position of the aircraft 10;
  a second estimation 127 of a current path of the aircraft 10; and
  a third estimation 128 of the predicted altitude Zp equal to an altitude of a point of contact between the current path of the aircraft 10 and the terrain stored in the terrain database.

The predicted altitude Zp may also be defined by a warning associated with the terrain database TAWS and serving to warn of the proximity of the terrain and of a potential collision of the aircraft 10 with the terrain. The predicted altitude Zp is defined as being equal to the altitude of a point of contact between the aircraft 10 and the terrain, this altitude being extracted from the terrain database TAWS.

In addition, during the first determination 120, the two parameters that are determined may be the current altitude Zc and the altitude variation $\Delta Z$ between the current altitude Zc and the predicted altitude Zp.

The current altitude Zc is defined by the measurement device 18 as described above, and the altitude variation $\Delta Z$ may be determined in a manner identical to the first implementation.

The predicted altitude Zp may then be calculated by the calculator 2 on the basis of these two parameters, the predicted altitude Zp being equal to the difference between the current altitude Zc and the altitude variation ΔZ.

Thereafter, during a second determination 130, a predicted atmospheric pressure Pp is determined for the predicted altitude Zp.

In the first implementation of the method, the second determination 130 comprises the following substeps:
- a fourth estimation 131 of the current altitude Zc as a function solely of the current atmospheric pressure Pc or else as a function of the current atmospheric pressure Pc and of the current temperature Tc;
- an eighth determination 132 of an atmospheric pressure variation ΔP between the current altitude Zc and the predicted altitude Zp as a function of the altitude variation ΔZ and using curves for variation in atmospheric pressure with altitude, and as a function of the current altitude Zc, these curves for variation of atmospheric pressure being stored in the memory 3; and
- a second calculation 133 of the predicted atmospheric pressure Pp performed by the calculator 2, the predicted atmospheric pressure Pp being determined by adding the atmospheric pressure variation ΔP to the current atmospheric pressure Pc.

The current atmospheric pressure Pc on its own enables the barometric altitude to be estimated. The current atmospheric pressure Pc and the current temperature Tc when used together serve to estimate the density altitude.

In the second implementation of the method, the second determination 130 comprises the following substeps:
- a third calculation 134 of two normal pressures, respectively for the current altitude Zc and for the predicted altitude Zp by the calculator 2 applying a barometric leveling formula;
- a ninth determination 135 of an atmospheric pressure variation ΔP between the current altitude Zc and the predicted altitude Zp, the atmospheric pressure variation ΔP being equal to the difference between the two normal pressures relating to the current altitude Zc and to the predicted altitude Zp; and
- a fourth calculation 136 of the predicted atmospheric pressure Pp performed by the calculator 2, the predicted atmospheric pressure Pp being determined by adding the atmospheric pressure variation ΔP to the current atmospheric pressure Pc.

A barometric leveling formula serves to calculate atmospheric pressure as a function of altitude while making assumptions about conditions for temperature variations and for atmospheric pressure and also concerning a value for the atmospheric pressure at a reference altitude.

For example, assuming that there is a temperature gradient equal to 0.65° C. per 100 meters (m), and for a reference altitude equal to 0, corresponding to sea level, assuming a temperature equal to 15° C. and an atmospheric pressure equal to 1013.25 hectopascals (1013.25 hPa), the following barometric leveling formula is obtained:

$$P(z) = 1013.25 \times \left(1 - \frac{0.0065 \times z}{288.15}\right)^{5.255}$$

with the pressure P being expressed in hectopascals (or millibars) and with the altitude z expressed in meters.

Furthermore, during a third determination 140, a predicted temperature Tp is determined for the predicted altitude Zp by subtracting a temperature variation ΔT from the current temperature Tc at the current altitude Zc of the aircraft 10.

For this purpose, the third determination 140 of the predicted temperature Tp comprises the following substeps:
- a fifth calculation 141 of a temperature variation ΔT between the current altitude Zp at the predicted altitude Zp as a function of the altitude variation ΔZ, e.g. by using an assumption for the temperature gradient; and
- a sixth calculation 142 of the predicted temperature Tp at the predicted altitude Zp performed by the calculator 2, the predicted temperature Tp being determined by adding the temperature variation ΔT to the current temperature Tc.

The steps of the second and third determinations 130 and 140 may be performed simultaneously or else sequentially.

During a fourth determination 150, a maximum power available from the power plant 20 at the predicted altitude Zp is determined while taking account of the predicted atmospheric pressure Pp and of the predicted temperature Tp.

The maximum power available from the power plant 20 is equal to the sum of the maximum powers available from the two engines 21 and 22 of the power plant 20. This maximum power available from an engine 21, 22 may for example be equal to the guaranteed minimum power of an engine as determined using a performance curve for the aircraft 10 given as a function of atmospheric pressure and temperature.

In addition, during this fourth determination 150, the maximum power available from the power plant 20 may be determined while taking account of the aging of each engine 21, 22. For this purpose, the fourth determination 150 includes additional steps:
- a tenth determination 151 of a power margin of the power plant 20 relative to a guaranteed minimum power $P_G$, the power margin characterizing a state of aging of the power plant 20; and
- a seventh calculation 152 of the maximum power available from the power plant 20, this maximum power available being equal to the sum of the guaranteed minimum power $P_G$ determined by means of a performance curve as a function of predicted atmospheric pressure Pp and predicted temperature Tp, plus the power margin of the power plant 20.

This power margin for each engine may be equal to the value of the power margin determined during the most recent health inspection of the engine.

This power margin for each engine may also be determined while taking account of the length of time the engine has been used since the latest health inspection of the engine, and also of the flight time needed to reach the point where the predetermined maneuver is to be performed. On this assumption, the tenth determination 151 of the power margin of the power plant 20 comprises the following additional steps:
- an eleventh determination 155 of a curve for variation in the power margin of each engine 21 and 22 of the power plant 20 as a function of at least the two most recently performed engine health inspections of the power plant 20, this curve for variation in the power margin being stored in the memory 3;
- a twelfth determination 156 of a transit time Ts for the aircraft 10 to reach the predicted altitude Zp, preferably performed by dividing the absolute value ΔZ between the predicted altitude Zp and the current altitude Zc of the aircraft 10 by the speed of descent Vz; and a thirteenth determination 157 of the power margin of the power plant 20 on the basis of a curve showing variation in the power margin of the power plant 20 while taking account of the length of time the power plant 20 has been in operation since the most recently performed engine health inspection up to the current instant, while taking account of the transit time Ts.

An example of a curve for variation in the power margin of an engine 21, 22 is shown in FIG. 7.

This curve for variation in the power margin of an engine 21 and 22 was constructed from measurements A, B, C, and D of the power margin obtained during the most recent health inspections of the engine performed respectively at instants $t_A$, $t_B$, TC, and $t_D$, the power margin being the difference between the power that is actually available from the power plant 20 and the guaranteed minimum power $P_G$ for the power plant 20. Under such circumstances, knowing the length of time the power plant 20 has been operating up to the current instant $t_E$ and knowing the transit time Ts for the aircraft 10 to reach the predicted altitude Zp, it is possible at a point F to estimate the power that will actually be available from the power plant 20 relative to the guaranteed minimum power $P_C$ at the instant $t_F$ when the aircraft 10 reaches the point for performing the predetermined maneuver, i.e. the determination altitude Zp.

The power margin that is actually available from the power plant 20 at the current instant $t_E$ corresponding to the point E can also be determined by performing an engine health inspection in flight. This power margin actually available at the point E can thus be integrated in the variation curve before estimating the power margin that will actually be available from the power plant 20 at the instant $t_P$.

During a fifth determination 160, at least one characteristic power is determined for the power plant 20 needed for enabling the aircraft 10 to perform a predetermined maneuver. A characteristic power of the power plant 20 needed to enable the aircraft 10 to perform a predetermined maneuver is determined by the calculator 2 and on the basis of performance curves relating to the predetermined maneuver and stored in the memory 3. By way of example, a predetermined maneuver of the aircraft 10 may be the aircraft 10 performing hovering flight outside the ground effect or indeed hovering flight under the influence of the ground effect.

The method may then include an additional step 200 of displaying on a single graphics type display on the display device 4 both a maximum power available from the power plant 20 and at least one characteristic power of the power plant 20 needed for enabling the aircraft 10 to perform a predetermined maneuver. The guaranteed minimum power $P_G$ may also be displayed on this graphics type display.

A graphics type display on the display device 4 may take various forms, such as a dial 30 of substantially circular shape as shown in FIGS. 4 and 5, or else a vertical scale 40 as shown in FIG. 6.

In FIG. 4, a pointer 31 is movable in rotation over the dial 30 and indicates the instantaneous power delivered by the power plant 20. Marks 34 and 35 positioned on the outside of the dial 30 specify two characteristic powers of the power plant 20 needed for enabling the aircraft 10 to perform hovering flight outside the ground effect and hovering flight under the influence of the ground effect. The position of each mark 34, 35 may change depending on the flight conditions of the aircraft 10 and depending on the conditions of the surroundings around the aircraft 10. The characteristic powers and the instantaneous power are shown on the dial 30 as a percentage of the maximum power available from the power plant 20, this maximum power corresponding to the mark 39 that represents a value of 100% on the dial 30.

Nevertheless, the characteristic powers, the instantaneous power, and the maximum power could alternatively be represented on the dial 30 as a percentage of a reference power value.

In addition, the graduations of the dial 30 go beyond 100%, since the maximum power generally corresponds to normal and continuous operation of the aircraft 10 and of its engines in particular, however it can be exceeded temporarily by the instantaneous power. Furthermore, a characteristic power may exceed the maximum power, meaning that the predetermined maneuver cannot be performed safely under the flying conditions that the aircraft 10 is going to encounter when performing the predetermined maneuver.

Thus, the pilot can see quickly and easily firstly a first margin available between the instantaneous power and the maximum power, and secondly a second margin available between each characteristic power and the maximum power. Consequently, the pilot can adapt the use of the power of the power plant 20 in compliance with the first margin and can anticipate performing the predetermined maneuver in compliance with the second margin.

In FIG. 5, the power indications are given for each engine 21 and 22 of the power plant 20. As a result, two pointers 31 and 31' are movable in rotation over the dial 30 and give respectively the instantaneous power supplied by each of the engines 21 and 22 of the power plant 20. The marks 34 and 35 indicate two characteristic powers for each engine 21 and 22 needed for enabling the aircraft 10 to perform hovering flight outside the ground effect and hovering flight under the influence of the ground effect, and the mark 39 indicates the maximum power available from each engine 21 and 22.

Furthermore, regardless of the implementation, the method of predictive determination of at least one characteristic power needed for enabling an aircraft 10 to perform a predetermined maneuver is preferably performed while the aircraft 10 is performing flight that is stable. I.e. the parameters that are characteristic of the aircraft 10, and in particular a speed of descent Vz and a true air speed Vp of the aircraft 10 together with a torque Cm delivered by the power plant 20, are considered to be stable simultaneously.

In order to determine whether a parameter characteristic of the invention 10 is stable, a highpass filter, typically of the "washout" type, is applied by way of example to this characteristic parameter. The highpass filter has time constant τ. This parameter characteristic of the aircraft 10 may for example be considered as being stable when the difference between two consecutive values of this characteristic parameter that are separated by this time constant τ is less than a predetermined threshold. This characteristic parameter may also be considered as being stable when a derivative of the highpass filter is less than another predetermined threshold.

For example, if a characteristic parameter is the torque delivered by the power plant 20, it may be considered that a variation in this torque of less than 1% over a duration of one minute is indicative of stability. The threshold applied to the highpass filter may then be equal to 1%/60 per second, providing the torque from the power plant 20 is maintained below this threshold for a plurality of measurement cycles corresponding to about ten seconds.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of predictive determination of at least one characteristic power needed by a rotary-wing aircraft for performing a predetermined maneuver, the aircraft having a power plant, a plurality of sensors, at least one controller, and an instrument panel having at least one display device, the method comprising the following main steps when the aircraft is in flight:
   a first measurement, by the plurality of sensors, of a current atmospheric pressure Pc and of a current temperature Tc outside the aircraft at a current altitude Zc of the aircraft;
   a first determination, by the at least one controller, of at least one parameter relating either to the current altitude Zc of the aircraft, or to a predicted altitude Zp at which the predetermined maneuver of the aircraft is to be performed, or to the current altitude Zc of the aircraft and to the predicted altitude Zp at which the predetermined maneuver of the aircraft is to be performed;
   a second determination, by the at least one controller, of a predicted atmospheric pressure Pp at the predicted altitude Zp;
   a third determination, by the at least one controller, of a predicted temperature Tp at the predicted altitude Zp;
   a fourth determination, by the at least one controller, of a maximum power available from the power plant at the predicted altitude Zp while taking account of the predicted atmospheric pressure Pp and of the predicted temperature Tp;
   a fifth determination, by the at least one controller, of at least one characteristic power of the power plant needed by the aircraft to perform the predetermined maneuver; and
   displaying simultaneously on a single graphical type representation on at least one of the at least one display device of the instrument panel for a pilot of the aircraft to view, both (i) the maximum power available from the power plant and (ii) the at least one characteristic power of the power plant needed by the aircraft to perform the predetermined maneuver.

2. The method according to claim 1, wherein during the first determination, a single parameter relating to the current altitude Zc and the predicted altitude Zp is determined and is an altitude variation ΔZ between the current altitude Zc and the predicted altitude Zp.

3. The method according to claim 1, wherein during the first determination, two parameters are determined relating either to the current altitude Zc, or both to the current altitude Zc and to the predicted altitude Zp, a first parameter being the current altitude Zc and a second parameter being an altitude variation ΔZ between the current altitude Zc and the predicted altitude Zp.

4. The method according to claim 2, wherein the first determination comprises a second measurement of a current height Hc of the aircraft relative to the ground, the altitude variation ΔZ being equal to the current height Hc.

5. The method according to claim 2, wherein the first determination comprises the following substeps:
   a sixth determination of a descent speed Vz of the aircraft;
   a definition of a transit time Ts for reaching the predicted altitude Zp by the aircraft; and
   a first calculation of the altitude variation ΔZ, which is equal to the ratio of the descent speed Vz divided by the transit time Ts.

6. The method according to claim 1, wherein during the first determination two parameters are determined relating either to the current altitude Zc or to the predicted altitude Zp, a first parameter being the current altitude Zc and a second parameter being the predicted altitude Zp, an altitude variation ΔZ being equal to the difference between the current altitude Zc and the predicted altitude Zp.

7. The method according to claim 6, wherein during the first determination, the predicted altitude Zp is extracted from a terrain database.

8. The method according to claim 7, wherein the first determination comprises the following substeps:
   a seventh determination of the current position of the aircraft; and
   a first estimation of the predicted altitude Zp, which is equal to terrain altitude as stored in the terrain database for a position vertically below the current position of the aircraft.

9. The method according to claim 7, wherein the first determination comprises the following substeps:
   a seventh determination of the current position of the aircraft;
   a second estimation of a current path of the aircraft; and
   a third estimation of the predicted altitude Zp, which is equal to an altitude of a point of contact between the current path of the aircraft and the terrain stored in the terrain database.

10. The method according to claim 2, wherein, when during the first determination, a single parameter relating to the current altitude Zc and to the predicted altitude Zp is determined, the second determination of the predicted atmospheric pressure Pp comprises the following substeps:
    a fourth estimation of the current altitude Zc as a function solely of the current atmospheric pressure Pc or else as a function of the current atmospheric pressure Pc and of the current temperature Tc;
    an eighth determination of an atmospheric pressure variation ΔP between the current altitude Zc and the predicted altitude Zp as a function of the altitude variation ΔZ and using curves plotting variation of the atmospheric pressure with altitude, and as a function of the current altitude Zc, and
    a second calculation of the predicted atmospheric pressure Pp, the predicted atmospheric pressure Pp being determined by adding the atmospheric pressure variation ΔP to the current atmospheric pressure Pc.

11. The method according to claim 3, wherein, during the first determination, two parameters relating either to the current altitude Zc, or to the predicted altitude Zp, or to the current altitude Zc and to the predicted altitude Zp are determined, the second determination of the predicted atmospheric pressure Pp comprises the following substeps:
    a third calculation of two normal pressures, respectively for the current altitude Zc and for the predicted altitude Zp, by applying a barometric leveling formula;
    a ninth determination of an atmospheric pressure variation ΔP between the current altitude Zc and the predicted altitude Zp, the atmospheric pressure variation ΔP being equal to the difference between the two normal pressures relating to the current altitude Zc and to the predicted altitude Zp; and
    a fourth calculation of the predicted atmospheric pressure Pp, the predicted atmospheric pressure Pp being determined by adding the atmospheric pressure variation $\Delta P$ to the current atmospheric pressure Pc.

12. The method according to claim 2, wherein the third determination of the predicted temperature Tp comprises:
   a fifth calculation of a temperature variation $\Delta T$ between the current altitude Zp and the predicted altitude Zp as a function of the altitude variation $\Delta Z$; and
   a sixth calculation of the predicted temperature Tp at the predicted altitude Zp, the predicted temperature Tp being determined by adding the temperature variation $\Delta T$ to the current temperature Tc.

13. The method according to claim 1, wherein during the step of displaying, a guaranteed minimum power $P_G$ of the power plant is displayed on the graphical type representation, the guaranteed minimum power $P_G$ being determined as a function of the predicted temperature Tp and of the predicted atmospheric pressure Pp at the predicted altitude Zp.

14. The method according to claim 1, wherein the fourth determination of the maximum power available from the power plant includes the following additional steps:
   a tenth determination of a power margin of the power plant relative to a guaranteed minimum power $P_G$, the power margin characterizing a state of aging of the power plant; and
   a seventh calculation of the maximum power available from the power plant, the available maximum power being equal to the sum of the guaranteed minimum power $P_G$ plus the power margin of the power plant.

15. The method according to claim 14, wherein the tenth determination of the power margin of the power plant includes the following additional steps:
   an eleventh determination of a curve plotting variation of the power margin of the power plant as a function of at least the two most recently performed engine health inspections of the power plant;
   a twelfth determination of a transit time Ts for the aircraft to reach the predicted altitude Zp; and
   a thirteenth determination of the power margin of the power plant from the curve plotting variation of the power margin of the power plant and while taking account of the time the power plant has been in operation since the most recently performed engine health inspection up to the current instant, and taking account of the transit time Ts.

16. The method according to claim 1, wherein a predetermined maneuver of the aircraft is the aircraft performing hovering flight outside the ground effect, or else hovering flight under the influence of the ground effect.

17. The method according to claim 1, wherein the method is performed when the aircraft is in stable flight, flight of the aircraft being considered as being stable when a descent speed Vz and a true air speed Vp of the aircraft and also a torque Cm delivered by the power plant are considered as being stable simultaneously.

18. The method according to claim 17, wherein the descent speed Vz, the true air speed Vp, and the torque Cm are characteristic parameters of the aircraft and a characteristic parameter is considered as being stable when, on applying the characteristic parameter to a highpass filter, typically of the "washout" type, and having a time constant $\tau$, a difference between two consecutive values of the characteristic parameter that are separated by the time constant $\tau$ is less than a predetermined threshold.

19. The method according to claim 18, wherein values obtained by the filter for the descent speed Vz, the true air speed Vp, and the torque Cm are used in the calculations performed by the method of predictive determination of at least one characteristic power needed by a rotary-wing aircraft to perform a predetermined maneuver.

20. A device for predictive determination of at least one characteristic power needed by a rotary-wing aircraft to perform a predetermined maneuver, the device having a plurality of sensors, at least one controller, at least one memory, and at least one display device, the sensors providing measurements of information relating to the surroundings of the aircraft and/or to the state and to the operation of the aircraft and of its equipment and/or to the position and to the movements of the aircraft relative to its surroundings, the at least one controller receiving the measurements from the sensors and processing the information, wherein the memory stores curves plotting the performance of the aircraft, a curve plotting variation in the power margin of the power plant, one or more series of curves plotting variation of the atmospheric pressure as a function of altitude, and calculation instructions, the at least one controller using the calculation instructions in order to perform the method according to claim 1.

21. An aircraft comprising:
   a power plant;
   a plurality of sensors configured to measure a current atmospheric pressure Pc and a current temperature Tc outside the aircraft at a current altitude Zc of the aircraft;
   a controller configured to determine
      at least one parameter relating either to the current altitude Zc of the aircraft, or to a predicted altitude Zp at which the predetermined maneuver of the aircraft is to be performed, or to the current altitude Zc of the aircraft and to the predicted altitude Zp at which the predetermined maneuver of the aircraft is to be performed;
      a predicted atmospheric pressure Pp at the predicted altitude Zp;
      a predicted temperature Tp at the predicted altitude Zp;
      a maximum power available from the power plant at the predicted altitude Zp while taking account of the predicted atmospheric pressure Pp and of the predicted temperature Tp; and
      at least one characteristic power of the power plant needed by the aircraft to perform the predetermined maneuver; and
   an instrument panel having a display device configured to display simultaneously on a single graphical type representation for a pilot of the aircraft to view, both (i) the maximum power available from the power plant and (ii) the at least one characteristic power of the power plant needed by the aircraft to perform the predetermined maneuver.

* * * * *